(12) United States Patent
Li et al.

(10) Patent No.: US 7,847,528 B2
(45) Date of Patent: Dec. 7, 2010

(54) SINGLE-BOARD POWER SUPPLY STRUCTURE AND METHOD FOR PROVIDING POWER SUPPLY

(75) Inventors: Chengyong Li, Shenzhen (CN); Liyuan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/246,867

(22) Filed: Oct. 7, 2008

(65) Prior Publication Data

US 2009/0033297 A1 Feb. 5, 2009

Related U.S. Application Data

(63) Continuation of application No. PCT/CN2007/000789, filed on Mar. 12, 2007.

(30) Foreign Application Priority Data

May 19, 2006 (CN) .................. 2006 1 0081025

(51) Int. Cl.
*G05F 1/577* (2006.01)
(52) U.S. Cl. .................... 323/267; 363/21.04
(58) Field of Classification Search .............. 363/54, 363/50, 52, 74–76, 84–89, 21.04, 65; 323/224, 323/244, 318, 267–269
See application file for complete search history.

(56) References Cited

U.S. PATENT DOCUMENTS

| | | | | |
|---|---|---|---|---|
| 4,797,833 | A * | 1/1989 | El-Amawy et al. | 702/60 |
| 5,631,546 | A | 5/1997 | Heinke et al. | |
| 6,005,773 | A * | 12/1999 | Rozman et al. | 361/707 |
| 6,459,175 | B1 * | 10/2002 | Potega | 307/149 |
| 6,809,678 | B2 * | 10/2004 | Vera et al. | 341/166 |
| 7,019,505 | B2 * | 3/2006 | Dwarakanath et al. | 323/283 |

(Continued)

FOREIGN PATENT DOCUMENTS

CN 1472863 A 2/2004

(Continued)

OTHER PUBLICATIONS

Guo, Rong-xiang et al. "Development of Distributed Communication Power Technology" EIC. Sep. 16, 2003.

(Continued)

*Primary Examiner*—Rajnikant B Patel
(74) *Attorney, Agent, or Firm*—Brinks Hofer Gilson & Lione

(57) ABSTRACT

A single-board power supply structure and a method for providing a power supply are provided. An operational processor sends control signals capable of controlling the output of the power supply to a DC/DC converter. The DC/DC converter converts a received bus voltage into a required power supply voltage according to the received control signals. The operational processor may further monitor the output of the power supply and report the monitored result to a connected upper-layer machine, and may also control the sequence of a plurality of the outputs of the power supply converted by the DC/DC converter by controlling the time for sending the control signals. The structure and the method provided by the present invention can both uniformly, timely, and effectively monitor the output of the single-board power supply.

14 Claims, 7 Drawing Sheets

U.S. PATENT DOCUMENTS

2004/0217750 A1    11/2004    Brown et al.

FOREIGN PATENT DOCUMENTS

| CN | 2639935 Y | 9/2004 |
| CN | 2655309 Y | 11/2004 |
| CN | 100426193 C | 10/2008 |
| JP | 2000-295769 | 10/2000 |

OTHER PUBLICATIONS

Written Opinion of the International Searching Authority issued in corresponding PCT Application No. PCT/CN2007/000789; mailed Jul. 5, 2007.

Office Action issued in corresponding Chinese Patent Application No. 2006100810254; issued Dec. 7, 2007.

* cited by examiner

SINGLE-BOARD POWER SUPPLY STRUCTURE AND METHOD FOR PROVIDING POWER SUPPLY

CROSS REFERENCE TO RELATED APPLICATIONS

The present application is a continuation of International Patent Application No. PCT/CN2007/000789, filed Mar. 12, 2007, which claims the benefit of Chinese Patent Application No. 200610081025.4, filed on May 19, 2006, both of which are herein incorporated by reference in their entireties.

BACKGROUND OF THE INVENTION

1. Field of the Invention

The present invention relates to power supply technology, and more particularly to a single-board power supply structure and a method for providing power supply.

2. Background of the Invention

In recent years, with the increasing complexity of single-board of communication products, more and more paths for supplying power to a single-board chip on a single board emerge, which results in an increasingly complicated single-board power supply structure. Currently, because single-board power supplies for the communication products commonly employ the analog power supply, various types of single-board analog converters are required to perform voltage and current conversions related to the operations of the single-board power supplies. At present, there are two familiar power input modes for the single-board for the communication products. One is to input a power supply into a single board after a low bus voltage of 12 V, 5 V, or 3.3 V is obtained through the conversion of a preceding-stage power supply converter. The other mode is based on a commonly single-board system with a bus voltage of 48 V, i.e. to directly input a bus voltage of 48 V into a single board.

Power supply structures in the prior art are briefly described below based on the above two power supply input modes.

Prior Art 1:

FIG. 1 shows a power supply structure of Prior Art 1. The single-board power supply structure in FIG. 1 includes analog non-isolated DC/DC converters 11, 12, 13 and a single-board chip 14. The analog non-isolated DC/DC converters 11, 12, and 13 are analog non-isolated DC/DC converters or analog non-isolated linear DC/DC converters. When the single-board chip 14 needs a low bus voltage of 12 V, 5 V, or 3.3 V, the low bus voltage of 12 V, 5 V, or 3.3 V obtained through the conversion of a preceding-stage power supply converter can be directly employed. When the single-board chip 14 requires other voltages, the low bus voltage of 12 V, 5 V, or 3.3 V has to be converted into a desired voltage of the single-board chip 14 by the analog non-isolated DC/DC converters 11, 12, and 13.

Prior Art 2:

FIG. 2 shows a power supply structure of Prior Art 2. The single-board power supply structure in FIG. 2 includes analog non-isolated DC/DC converters 21, 22, and 23, a single-board chip 24, and an analog isolated DC/DC converter 25. The analog non-isolated DC/DC converters 21, 22, and 23 are analog non-isolated DC/DC converters or analog non-isolated linear DC/DC converters. In practice, a bus voltage of 48 V is converted into a low bus voltage of 12 V, 5 V, or 3.3 V by the analog isolated DC/DC converter 25. When the single-board chip 24 needs a low bus voltage of 12 V, 5 V, or 3.3 V, the low bus voltage of 12 V, 5 V, or 3.3 V is directly employed. When the single-board chip 24 requires other voltages, the low bus voltage of 12 V, 5 V, or 3.3 V has to be converted into a required voltage of the single-board chip by the analog non-isolated DC/DC converters or the analog non-isolated linear DC/DC converters 21, 22, and 23.

When the single board has sequence requirements on input currents, a complex sequence control generally needs to be additionally performed. The principle of a sequence control is shown in FIG. 3. Referring to FIG. 3, sequence control drive signals are usually generated by a sequence control chip. The sequence control drive signals can respectively control MOS transistor power drive amplifiers 305, 306, 307, and 308 to enter a turn-on or cut-off state, so as to implement a sequence control on currents input to a single-board chip 313.

In order to protect a device from being damaged due to factors such as overvoltage, the converted voltage and current input to the single-board chip 313 need to be effectively monitored, so as to be adjusted based on monitoring. Because an analog non-isolated DC/DC converter usually can only perform a voltage and current conversion and cannot effectively monitor signals such as voltage and current, the monitoring is generally performed by an upper-layer machine capable of monitoring the voltage and current alone. However, the monitoring capability of the upper-layer machine is limited. For example, when an overvoltage situation occurs, and the upper-layer machine fails to respond in time, the DC/DC converter may not timely and effectively controlled to buck. Thereby, the single-board chip 313 is often damaged due to overvoltage.

Obviously, the current single-board power supply structures in the communication systems have the following problems.

1. With the increasing complexity of the single board, the voltage required by the single board becomes more and more complicated. As such, a single board needs various types of analog converters that cannot be uniformly managed.

2. Because the monitoring capability of the upper-layer machine over the voltage and current is limited, the single-board chip cannot be timely and effectively protected.

3. When the single-board voltage has complex sequence requirements, a specialized sequence control chip is needed for additionally performing a complex sequence control.

SUMMARY OF THE INVENTION

According to embodiments of the present invention, a single-board power supply structure and a method for providing power supply are provided, so that the output of the single-board power supply may be uniformly, timely and effectively monitored.

In order to achieve the above objective, the technical solutions of the present invention are implemented as follows.

A single-board power supply structure, includes an operational processor and a DC/DC converter (C) connected with each other, in which the operational processor is adapted to send control signals to the DC/DC converter (C), for controlling the output of the power supply of the DC/DC converter (C); and the DC/DC converter (C) is adapted to convert a received bus voltage into a required power supply voltage according to the received control signals.

A method for providing a single-board power supply, includes: sending, by an operational processor, control signals to a DC/DC converter (C), for controlling the output of the power supply of the DC/DC converter (C), and converting, by the DC/DC converter (C), a received bus voltage into a required power supply voltage according to the received control signals.

Compared with the prior art, according to either the single-board power supply structure or the method for providing a power supply of the present invention, control signals capable of controlling the output of the power supply may be sent to a DC/DC converter by an operational processor, and then a received bus voltage may be converted into a required power supply voltage by the DC/DC converter according to the received control signals. Therefore, by either the structure or the method provided by the present invention, the output of the single-board power supply may be uniformly, timely, and effectively monitored.

BRIEF DESCRIPTION OF THE DRAWINGS

The present invention will become more fully understood from the detailed description given herein below for illustration only, and thus are not limitative to the present invention.

DETAILED DESCRIPTION OF THE EMBODIMENTS

The present invention is illustrated in detail below by reference to embodiments and the accompanying drawings.

According to both the single-board power supply structure and the method for providing a power supply of the present invention, control signals capable of controlling the output of the power supply may be sent to a DC/DC converter by an operational processor, and a received bus voltage may be converted into a required power supply voltage by the DC/DC converter according to the received control signals. In addition, the operational processor may further monitor the output of the power supply and report the monitored result to a connected upper-layer machine, and may also control the sequence of a plurality of the outputs of the power supply converted by the DC/DC converter by controlling the time for sending the control signals.

Figure 1:
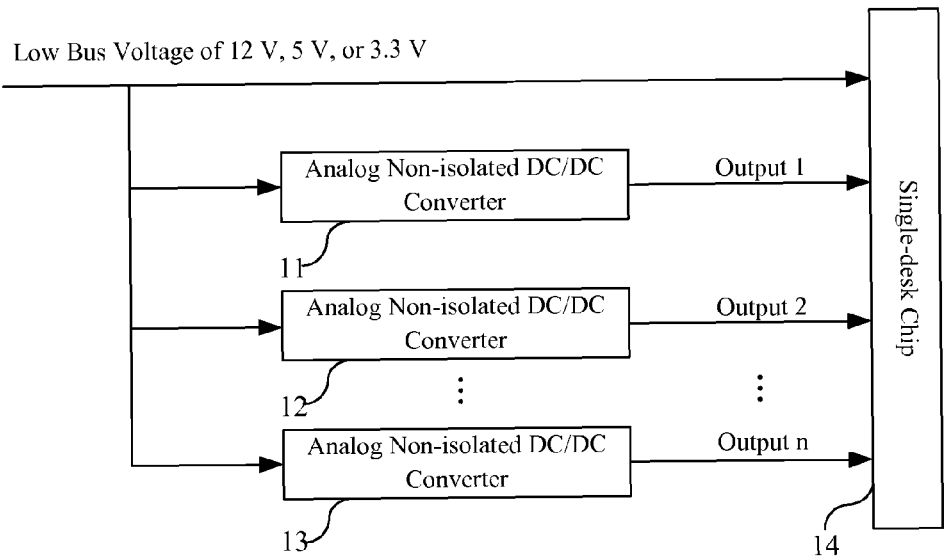
FIG. 1 shows a power supply structure of Prior Art 1.
Figure 2:
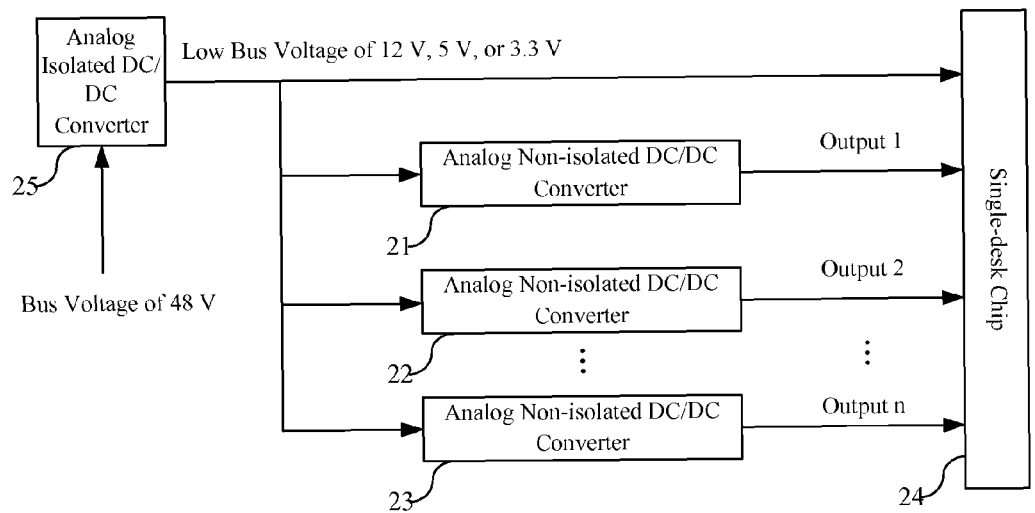
FIG. 2 shows a power supply structure of Prior Art 2.
Figure 3:
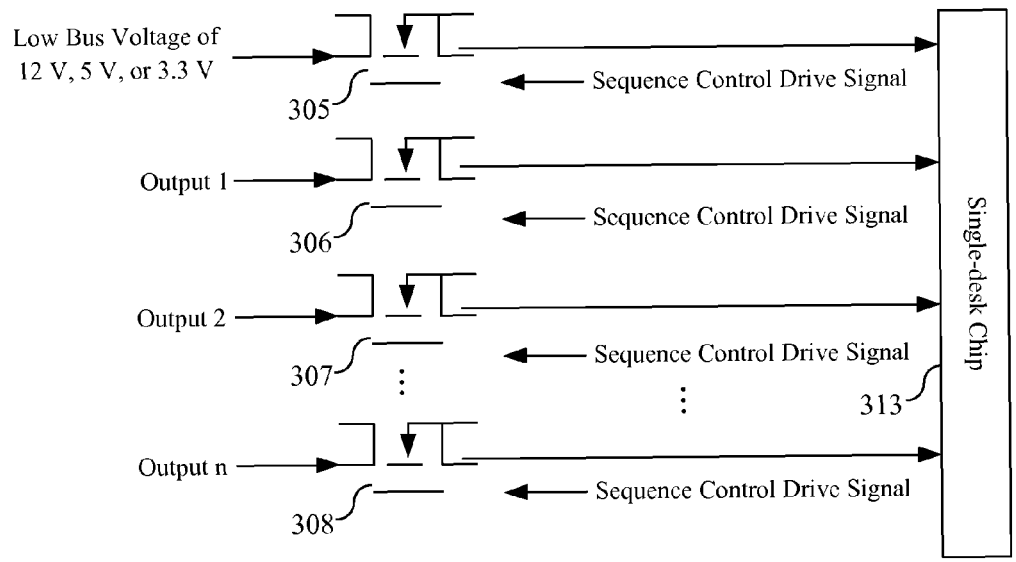
FIG. 3 is a schematic view of a sequence control in the prior art.
Figure 4:
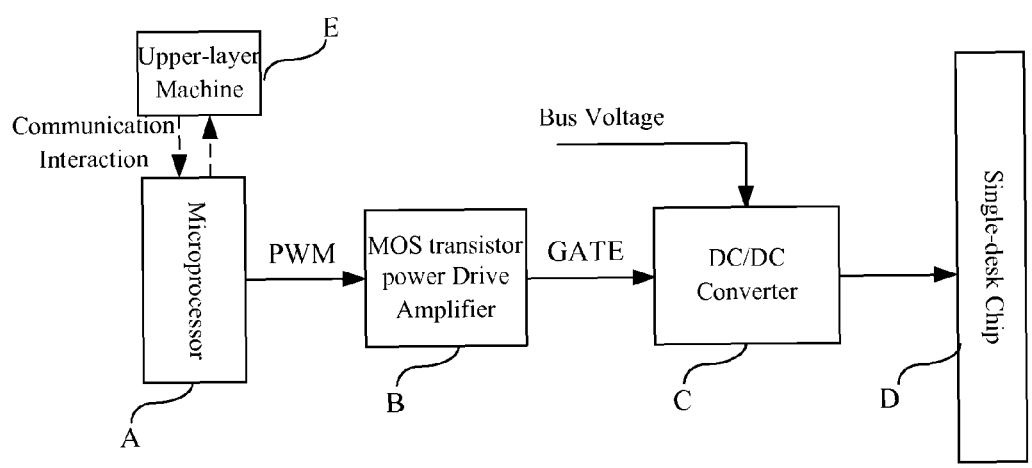
FIG. 4 is a simplified view of the principle of a power supply structure of the present invention.

An embodiment of the present invention is shown in FIG. 4. Referring to FIG. 4, a microprocessor (A), an MOS transistor power drive amplifier (B), a DC/DC converter (C and a single-board chip (D) are sequentially connected. The microprocessor (A) is also connected to an upper-layer machine (E).

In practice, the microprocessor (A) generates a PWM pulse with an adjustable duty ratio. The PWM pulse is amplified by the MOS transistor power drive amplifier (B), and then drives the DC/DC converter (C) to convert a received bus voltage into a required chip voltage of the single-board chip (D). In particular, the process of driving the DC/DC converter (C) so as to achieve the voltage and current conversion usually includes the following steps. The MOS transistor power drive amplifier (B) sends a GATE signal formed after the amplification of the PWM pulse to the DC/DC converter (C), and the GATE signal triggers the DC/DC converter (C) to perform a voltage and current conversion.

In addition, the microprocessor (A) may monitor the voltage and current output to the single-board chip (D) and report the monitored result to the upper-layer machine (E) via a communication interface. Definitely, the microprocessor (A) may adjust the voltage and current output by the DC/DC converter (C) by sending a PWM pulse to the MOS transistor power drive amplifier (B).

Embodiments of the present invention are illustrated in detail below by reference to the accompanying drawings.

For clear demonstration of the technical features of the present invention through the detailed description of the embodiments, the number of the non-isolated DC/DC converter and MOS transistor power drive amplifier in the figures corresponding to each embodiment of the present invention is generally three. It should be understood that in practice, the number of the non-isolated DC/DC converter and MOS transistor power drive amplifier is not necessarily three, and may also be one or more.

Embodiment 1

Figure 5:
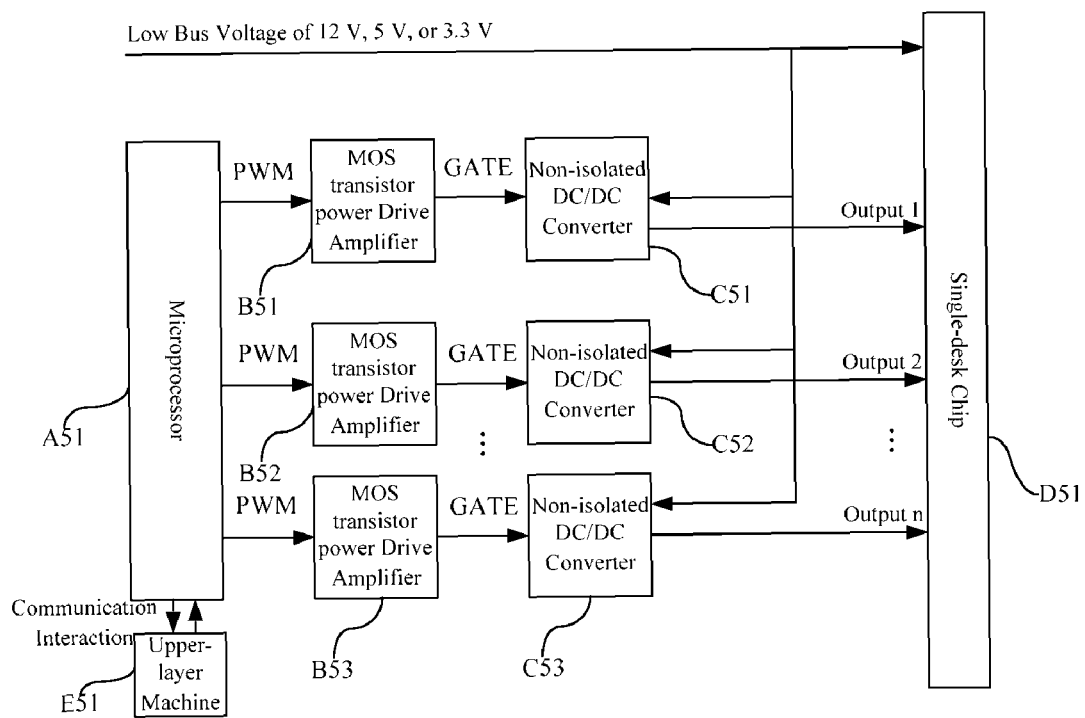
FIG. 5 shows a power supply structure according to a first embodiment of the present invention.

FIG. 5 shows a power supply structure according to a first embodiment of the present invention. Referring to FIG. 5, a plurality of MOS transistor power drive amplifiers and a plurality of non-isolated DC/DC converters are sequentially connected between a microprocessor A51 and a single-board chip D51. Each MOS transistor power drive amplifier and each non-isolated DC/DC converter are connected in series. Moreover, the microprocessor A51 is connected to an upper-layer machine E51.

In practice, the microprocessor A51 generates a PWM pulse with an adjustable duty ratio. The PWM pulse is divided into three parts and respectively amplified by MOS transistor power drive amplifiers B51-B53, so as to respectively drive non-isolated DC/DC converters C51-C53 to convert a low bus voltage of 12 V, 5 V, or 3.3 V into a required chip voltage of the single-board chip D51. Moreover, when the single-board chip D51 needs the low bus voltage, the low bus voltage may be directly input to the single-board chip D51. Specifically, the process of driving the non-isolated DC/DC converters so as to achieve the voltage and current conversions usually includes the following steps. The MOS transistor power drive amplifiers send GATE signals formed after the amplification of the PWM pulses to the non-isolated DC/DC converters, and the GATE signals trigger the non-isolated DC/DC converters to perform voltage and current conversions.

Further, the microprocessor A51 may monitor the voltages and currents input to the single-board chip D51 by sampling or other means, and report periodically or in real time the monitored result such as a sampling result to the upper-layer machine E51 via a communication interface. Definitely, the microprocessor A51 may adjust the voltages and currents output by the non-isolated DC/DC converters by sending PWM pulses to the MOS transistor power drive amplifiers. For example, when monitoring that the voltage output by the non-isolated DC/DC converter C51 is too high, the microprocessor A51 sends a PWM pulse for bucking the voltage to the MOS transistor power drive amplifier B51. The PWM pulse is then amplified by the MOS transistor power drive amplifier B51, and drives the non-isolated DC/DC converter C51 to obtain by conversion a voltage lower than the previous output voltage.

In addition, if a sequence is required among the voltages output to the single-board chip D51, the microprocessor A51 may precisely control the time of the MOS transistor power drive amplifiers in a turn-on or cut-off state by controlling the time for outputting the PWM pulses, so as to achieve a precise sequence control over the currents input to the single-board chip D51. That is, a precise sequence control of the single-board power supply is realized.

Embodiment 2

Figure 6:
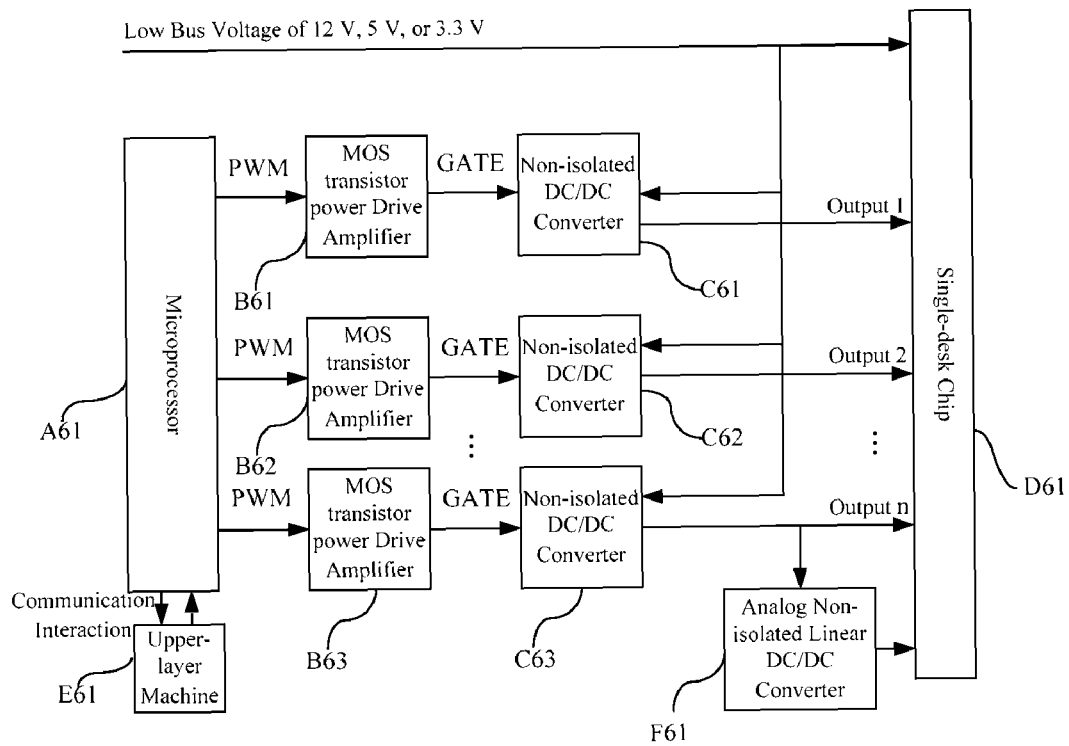
FIG. 6 shows a power supply structure according to a second embodiment of the present invention.

FIG. 6 shows a power supply structure according to a second embodiment of the present invention. This power supply structure can be obtained by modifying the first embodiment. FIG. 6 is different from FIG. 5 in that: an analog non-isolated linear DC/DC converter F61 is further connected in series between a non-isolated DC/DC converter C63 and a single-board chip D61. The analog non-isolated linear DC/DC converter F61 may perform a linear conversion on a voltage from the non-isolated DC/DC converter C63, then obtain a required voltage of the single-board chip D61, and output the voltage to the single-board chip D61.

In practice, the analog non-isolated linear DC/DC converter F61 may be connected in series between any of the non-isolated DC/DC converters and the single-board chip D61. The non-isolated DC/DC converters may be ordinary analog non-isolated DC/DC converters or analog non-isolated linear DC/DC converters.

Embodiment 3

Figure 7:
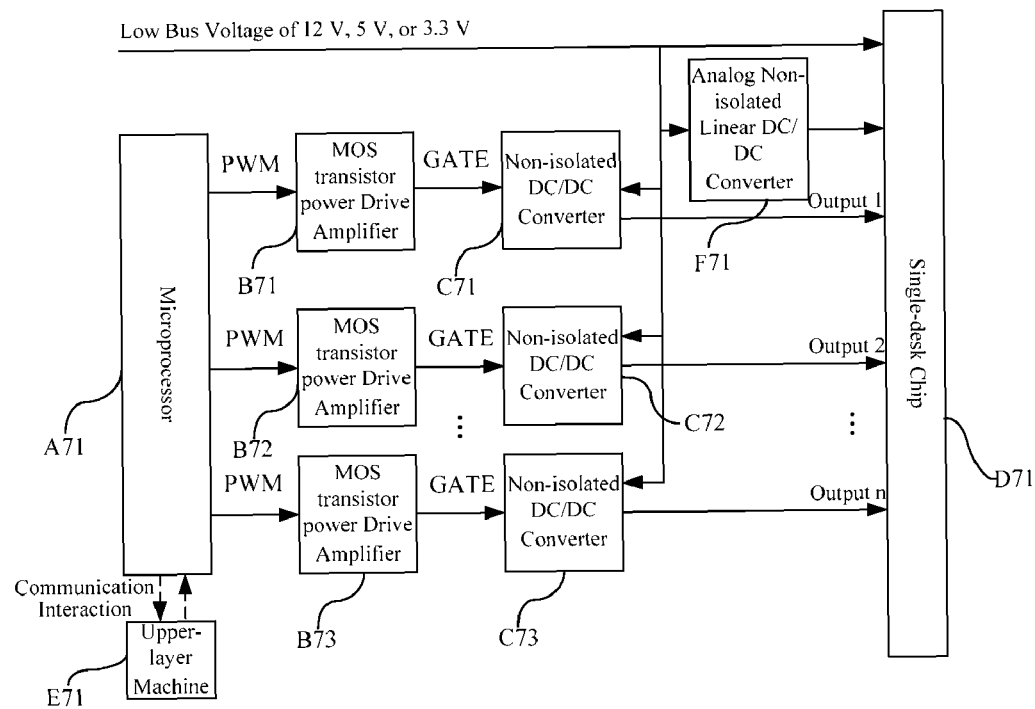
FIG. 7 shows a power supply structure according to a third embodiment of the present invention.

FIG. 7 shows a power supply structure according to a third embodiment of the present invention. This power supply structure can be obtained by modifying the first embodiment. FIG. 7 is different from FIG. 5 in that: a single-board chip D71 is further connected to an analog non-isolated linear DC/DC converter F71. The analog non-isolated linear DC/DC converter F71 may receive a low bus voltage of 12 V, 5 V, or 3.3 V, then directly convert the received bus voltage into a required voltage of the single-board chip D71, and output the voltage to the single-board chip D71.

Embodiment 4

Figure 8:
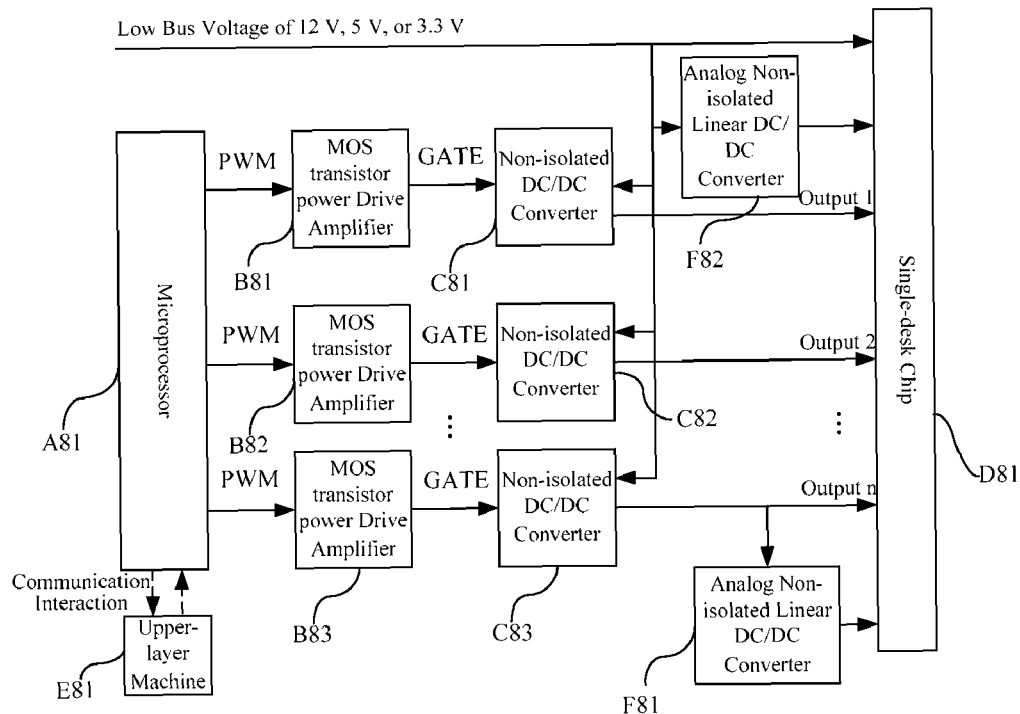
FIG. 8 shows a power supply structure according to a fourth embodiment of the present invention.

FIG. 8 shows a power supply structure according to a fourth embodiment of the present invention. This power supply structure can be obtained by modifying the third embodiment. FIG. 8 is different from FIG. 7 in that: an analog non-isolated linear DC/DC converter F81 is further connected in series between a non-isolated DC/DC converter C83 and a single-board chip D81. The analog non-isolated linear DC/DC converter F81 may perform a linear conversion on a voltage from the non-isolated DC/DC converter C83, then obtain a required voltage of the single-board chip D81, and output the voltage to the single-board chip D81.

In practice, the analog non-isolated linear DC/DC converter F81 may be connected in series between any of the non-isolated DC/DC converters and the single-board chip D81. The non-isolated DC/DC converters may be ordinary analog non-isolated DC/DC converters or analog non-isolated linear DC/DC converters.

Embodiment 5

Figure 9:
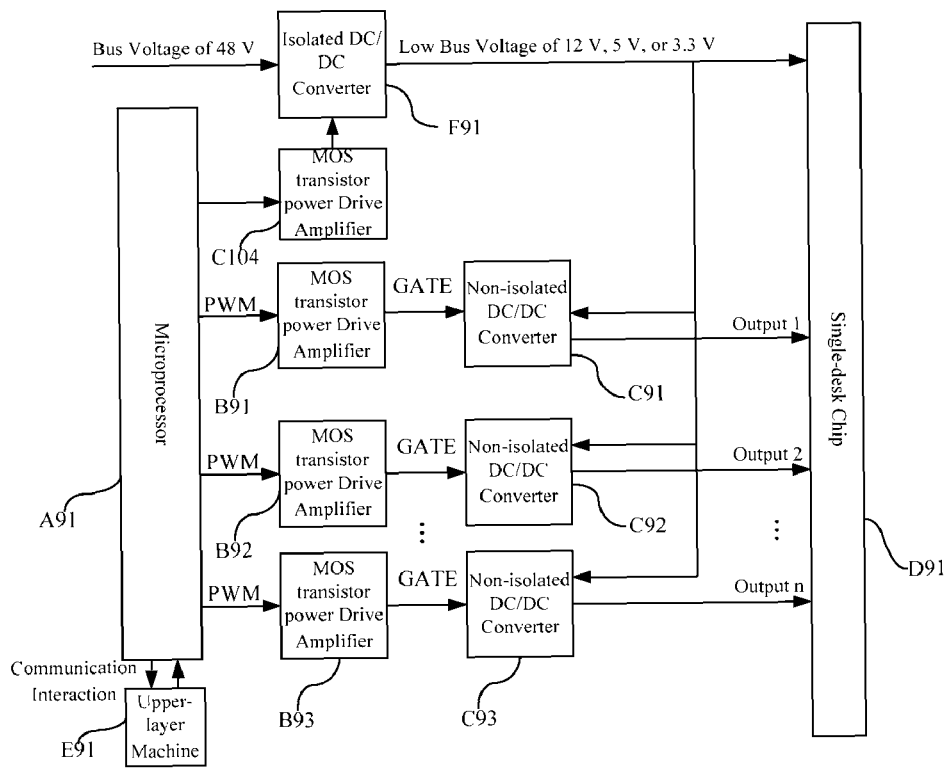
FIG. 9 shows a power supply structure according to a fifth embodiment of the present invention.

FIG. 9 shows a power supply structure according to a fifth embodiment of the present invention. This power supply structure can be obtained by modifying the first embodiment. FIG. 9 is different from FIG. 5 in that: an MOS transistor power drive amplifier C104 and an isolated DC/DC converter F91 are further connected in series between a microprocessor A91 and a single-board chip D91. A low bus voltage of 12 V, 5 V, or 3.3 V is obtained through the conversion of the isolated DC/DC converter F91. The conversion method includes the following steps. The microprocessor A91 generates a PWM pulse with an adjustable duty ratio. The PWM pulse is amplified by the MOS transistor power drive amplifier C104, and then drives the isolated DC/DC converter F91 to convert a received commonly adopted bus voltage of 48 V into a low bus voltage of 12 V, 5 V, or 3.3 V.

Embodiment 6

Figure 10:
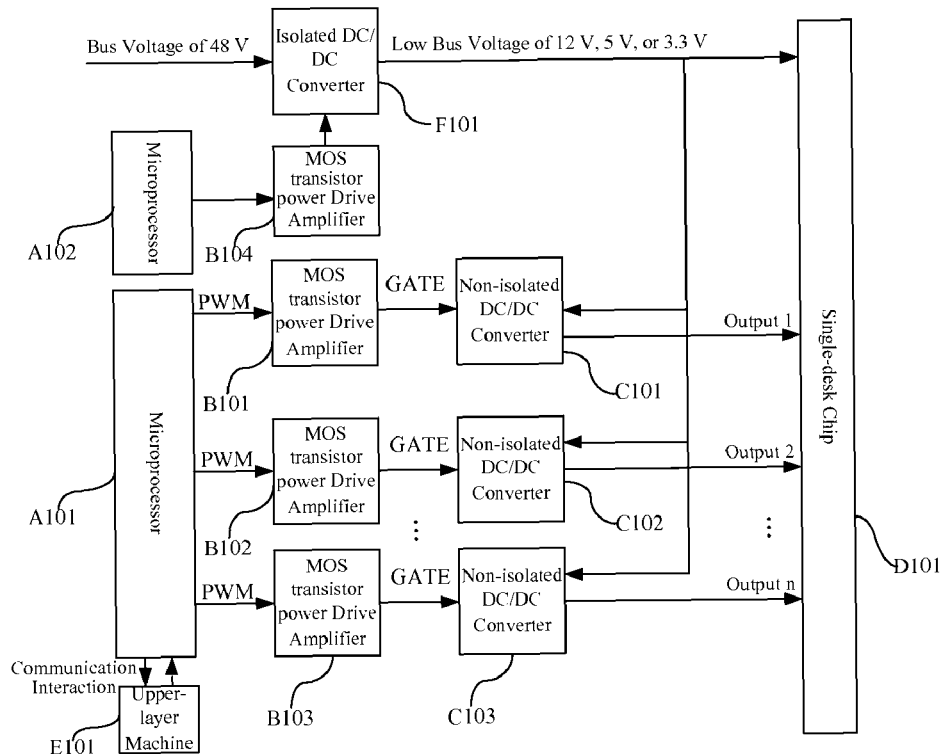
FIG. 10 shows a power supply structure according to a sixth embodiment of the present invention.

FIG. 10 shows a power supply structure according to a sixth embodiment of the present invention. This power supply structure can be obtained by modifying the fifth embodiment. FIG. 10 is different from FIG. 9 in that: an MOS transistor power drive amplifier B104 is connected in series to a microprocessor A102, instead of a microprocessor A101, so that the microprocessor A102 may independently control an isolated DC/DC converter F101 to perform a voltage and current conversion.

Embodiment 7

Figure 11:
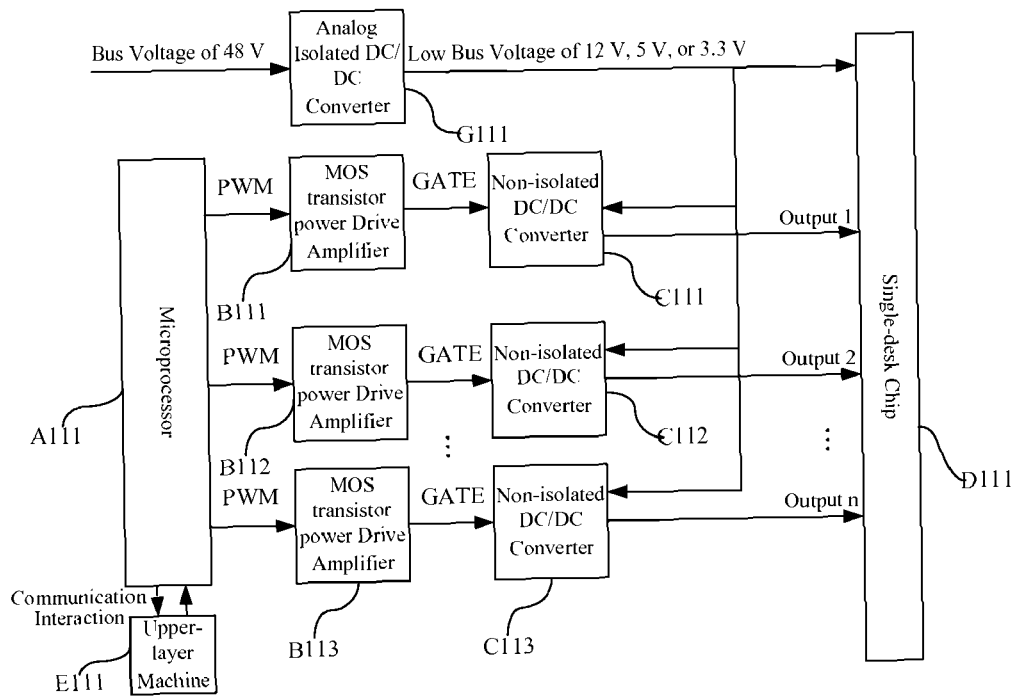
FIG. 11 shows a power supply structure according to a seventh embodiment of the present invention.

FIG. 11 shows a power supply structure according to a seventh embodiment of the present invention. This power supply structure can be obtained by modifying the first embodiment. FIG. 11 is different from FIG. 5 in that: a single-board chip D111 is further connected to an analog isolated DC/DC converter G111. A low bus voltage of 12 V, 5 V, or 3.3 V is obtained through the conversion of the analog isolated DC/DC converter G111. The conversion method includes the following step. The analog isolated DC/DC converter G111 converts a received commonly adopted bus voltage of 48 V into a low bus voltage of 12 V, 5 V, or 3.3 V.

Embodiment 8

Figure 12:
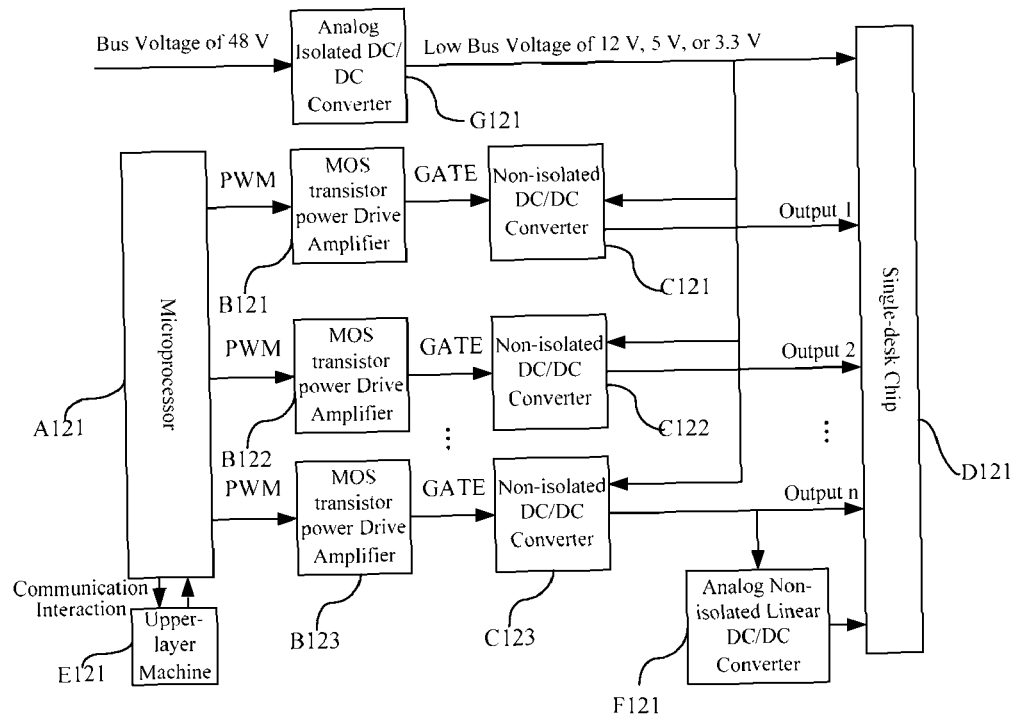
FIG. 12 shows a power supply structure according to an eighth embodiment of the present invention.

FIG. 12 shows a power supply structure according to an eighth embodiment of the present invention. This power supply structure can be obtained by modifying the seventh embodiment. FIG. 12 is different from FIG. 11 in that: an analog non-isolated linear DC/DC converter F121 is further connected in series between a non-isolated DC/DC converter C123 and a single-board chip D121. The analog non-isolated linear DC/DC converter F121 may perform a linear conversion on a voltage from the non-isolated DC/DC converter C123, then obtain a required voltage of the single-board chip D81, and output the voltage to the single-board chip D121.

In practice, the analog non-isolated linear DC/DC converter F121 may be connected in series between any of the non-isolated DC/DC converters and the single-board chip D121. The non-isolated DC/DC converters may be ordinary analog non-isolated DC/DC converters or analog non-isolated linear DC/DC converters.

Embodiment 9

Figure 13:
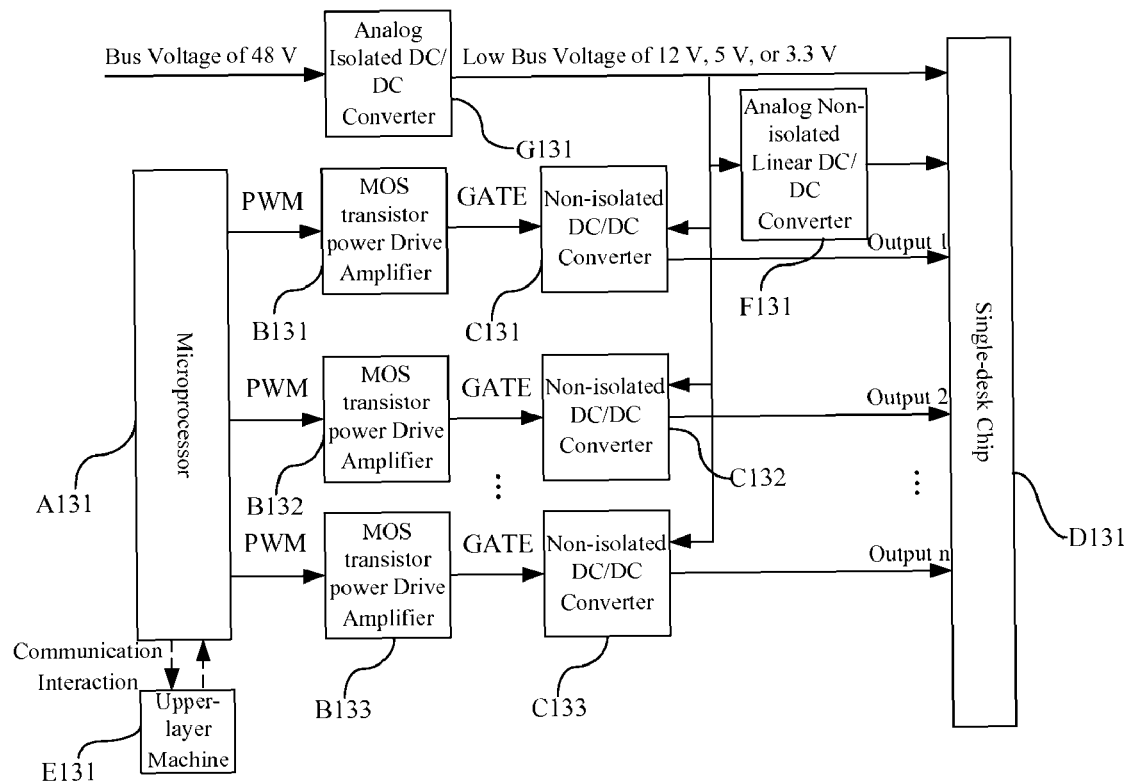
FIG. 13 shows a power supply structure according to a ninth embodiment of the present invention.

FIG. 13 shows a power supply structure according to a ninth embodiment of the present invention. This power supply structure can be obtained by modifying the seventh embodiment. FIG. 13 is different from FIG. 11 in that: a single-board chip D131 is further connected to an analog non-isolated linear DC/DC converter F131. The analog non-isolated linear DC/DC converter F131 may receive a low bus voltage of 12 V, 5 V, or 3.3 V, then directly convert the received bus voltage into a required voltage of the single-board chip D131, and output the voltage to the single-board chip D131.

In practice, the non-isolated DC/DC converters may be analog non-isolated DC/DC converters or digital non-isolated DC/DC converters. The MOS transistor power drive amplifiers may employ push-pull power drive amplifiers or integrated power drive amplifiers. Further, the non-isolated DC/DC converters may employ boost DC/DC converters capable of boosting the voltage, and may also employ non-isolated buck DC/DC converters capable of bucking the voltage. Similarly, the isolated DC/DC converters may employ isolated boost DC/DC converters capable of boosting the voltage, and may also employ isolated buck DC/DC converters capable of bucking the voltage.

In addition, in practice, other power drive amplifiers may also be used to replace the MOS transistor power drive amplifiers. Moreover, if the PWM pulse output by the microprocessor has a power large enough to normally trigger a DC/DC converter such as a non-isolated DC/DC converter to perform a voltage and current conversion, the MOS transistor power drive amplifiers may also be removed. In this manner, the microprocessor is directly connected to the DC/DC converter, and the PWM pulse output by the microprocessor directly controls the DC/DC converter to perform the voltage and current conversion. Further, the microprocessor may be an operational processor such as a single-chip microcomputer, a digital signal processor (DSP), a complex programmable logic device (CPLD), and a field programmable gate array (FPGA).

Besides, the single-board power supply structure and the method for providing a power supply of the present invention are also applicable to other technical fields, as long as the structure and the method can uniformly, timely, and effectively monitor voltages and currents serving as the outputs of the single-board power supply.

In view of the above, according to the single-board power supply structure and the method for providing a power supply of the present invention, the single-board power supply may be monitored uniformly, timely, and effectively monitor by the microprocessor, and further a precise sequence control over the single-board power supply may be achieved through the microprocessor, without requiring a specialized sequence control chip to additionally perform a complex sequence control, under the circumstance that analog converters of various types that cannot be uniformly managed do not exist.

What is claimed is:

1. A single-board power supply structure, comprising:
   an operational processor and at least two DC/DC converters (C) connected with the operational processor, wherein
      the operational processor is adapted to send Pulse-Width Modulation (PWM) control signals to the DC/DC converter (C), for controlling the output of the power supply of the DC/DC converter (C), monitor the output of the power supply of the DC/DC converter (C), and adjust the output of the power supply of the DC/DC converter (C) according to the monitored result by sending a PWM control signal; and
      the DC/DC converter (C) is adapted to convert a received bus voltage into power supply voltage required by the single-board according to the received PWM control signals;
      wherein the PWM pulse respectively drive the DC/DC converters to convert low bus voltage into at least two power supply voltages required by the single-board;
   the operational processor is further adapted to control the sequence of the outputs of the power supply converted by the DC/DC converter (C) by controlling the time for sending the control signals; and
   the at least two DC/DC converters (C) comprising a non-isolated DC/DC converter and/or an isolated DC/DC converter, the non-isolated DC/DC converter comprising a non-isolated buck DC/DC converter and/or a non-isolated boost DC/DC converter, and the isolated DC/DC converter comprising an isolated buck DC/DC converter and/or an isolated boost DC/DC converter.

2. The single-board power supply structure according to claim 1, wherein a power amplifier is further connected between the operational processor and the DC/DC converter (C), and the power amplifier is adapted to send a GATE signal formed after the amplification of the PWM pulse to the DC/DC converter (C), and the GATE signal triggers the DC/DC converter (C) to perform a voltage and current conversion.

3. The single-board power supply structure according to claim 2, wherein the number of the operational processor, the power amplifier, and the DC/DC converter (C) is respectively one or more.

4. The single-board power supply structure according to claim 1, wherein the operational processor is a single-chip microcomputer, a digital signal processor (DSP), a complex programmable logic device (CPLD), or a field programmable gate array (FPGA), which is in a microprocessor (A).

5. The single-board power supply structure according to claim 1, wherein the DC/DC converter (C) is further connected to a single-board chip (D) capable of receiving the output of the power supply.

6. The single-board power supply structure according to claim 5, wherein an analog non-isolated linear DC/DC converter is further connected to the single-board chip (D) alone, and/or connected between the single-board chip (D) and the DC/DC converter (C).

7. The single-board power supply structure according to claim 1, wherein:
   the operational processor is further adapted to monitor the output of the power supply and report the monitored result to a connected upper-layer machine.

8. A method for providing a single-board power supply, comprising:
   sending, by an operational processor, Pulse-Width Modulation (PWM) control signals to a DC/DC converter (C), for controlling the output of the power supply of the DC/DC converter (C);
   monitoring the output of the power supply of the DC/DC converter (C);
   adjusting the output of the power supply of the DC/DC converter (C) according to the monitored result by sending a PWM control signal; and
   converting, by the DC/DC converter (C), a received bus voltage into a power supply voltage required by the single-board according to the received PWM control signals;

wherein the PWM pulse respectively drive the DC/DC converters to convert low bus voltage into at least two power supply voltages required by the single-board the operational processor is further adapted to control the sequence of the outputs of the power supply converted by the DC/DC converter (C) by controlling the time for sending the control signals; and the at least two DC/DC converters (C) comprising a non-isolated DC/DC converter and/or an isolated DC/DC converter, the non-isolated DC/DC converter comprising a non-isolated buck DC/DC converter and/or a non-isolated boost DC/DC converter, and the isolated DC/DC converter comprising an isolated buck DC/DC converter and/or an isolated boost DC/DC converter.

9. The method according to claim 8, wherein before the DC/DC converter (C) receives the control signals, sending a GATE signal formed after the amplification of the PWM pulse to the DC/DC converter (C), and the GATE signal triggers the DC/DC converter (C) to perform a voltage and current conversion.

10. The method according to claim 8, wherein the conversion of the bus voltage comprises boosting the bus voltage and/or bucking the bus voltage.

11. The method according to claim 8, wherein an analog non-isolated linear DC/DC conversion is further performed on the output of the power supply of the DC/DC converter (C).

12. The method according to claim 8, wherein:
the output of the power supply is further monitored, and the monitored result is reported to an upper-layer machine.

13. The single-board power supply structure according to claim 1, wherein the output of the power supply of the DC/DC converter (C) monitored by the operational processor comprises: voltage and current output of power supply of the DC/DC converter (C); and the output of the power supply of the DC/DC converter (C) adjusted by the operational processor comprises: voltage and current output of power supply of the DC/DC converter (C).

14. The method according to claim 8, wherein the monitoring the output of the power supply of the DC/DC converter (C) comprises: monitoring the voltage and current output of power supply of the DC/DC converter (C), and the adjusting the output of the power supply of the DC/DC converter (C) according to the monitored result by sending a PWM control signal comprises: adjusting voltage and current output of the power supply of the DC/DC converter (C) according to the monitored result by sending a PWM control signal.

* * * * *